(12) United States Patent
Chen et al.

(10) Patent No.: US 12,015,350 B2
(45) Date of Patent: Jun. 18, 2024

(54) MULTI-PHASE CONVERTER INCLUDING A DUTY CYCLE LIMITER

(71) Applicant: P-DUKE TECHNOLOGY CO., LTD., Taichung (TW)

(72) Inventors: Lien-Hsing Chen, Taichung (TW); Ta-Wen Chang, Taichung (TW); Hsiao-Hua Chi, Taichung (TW); Ching-Ming Lai, Taichung (TW); Wei-Hsuan Lin, Taichung (TW)

(73) Assignee: P-DUKE TECHNOLOGY CO., LTD., Taichung (TW)

( * ) Notice: Subject to any disclaimer, the term of this patent is extended or adjusted under 35 U.S.C. 154(b) by 16 days.

(21) Appl. No.: 17/872,834

(22) Filed: Jul. 25, 2022

(65) Prior Publication Data
US 2024/0030821 A1 Jan. 25, 2024

(51) Int. Cl.
*H02M 3/158* (2006.01)
*H02M 1/00* (2006.01)

(52) U.S. Cl.
CPC ....... *H02M 3/1586* (2021.05); *H02M 1/0043* (2021.05)

(58) Field of Classification Search
CPC ............. H02M 3/1586; H02M 3/1584; H02M 3/1582; H02M 3/158; H02M 1/0043
See application file for complete search history.

(56) References Cited

U.S. PATENT DOCUMENTS

| | | | | |
|---|---|---|---|---|
| 7,230,405 B2* | 6/2007 | Jang | ............... | H02M 3/1584 323/284 |
| 8,089,254 B2* | 1/2012 | Khaligh | ............... | H02M 3/1582 323/283 |
| 8,232,779 B2* | 7/2012 | Lee | ............... | H02M 3/1584 323/212 |
| 9,413,230 B2* | 8/2016 | Umetani | ............... | H02M 7/103 |
| 10,498,236 B2* | 12/2019 | Liu | ............... | H02M 3/158 |
| 11,476,757 B2* | 10/2022 | Tanaka | ............... | H02M 1/088 |
| 11,552,544 B2* | 1/2023 | Scandola | ............... | H02M 3/1584 |

(Continued)

FOREIGN PATENT DOCUMENTS

| | | | |
|---|---|---|---|
| CN | 107070223 A | * | 8/2017 |
| CN | 110212763 A | * | 9/2019 |
| DE | 112007001127 T5 | * | 7/2009 | ............... G05F 1/70 |

OTHER PUBLICATIONS

Office Action dated Mar. 16, 2023 of the corresponding German patent application No. 102022118507.9.

*Primary Examiner* — Thienvu V Tran
*Assistant Examiner* — Yahveh Comas Torres
(74) *Attorney, Agent, or Firm* — Chun-Ming Shih; HDLS IPR SERVICES (57) ABSTRACT

A novel power supply apparatus (10) includes a microcontroller (102) and a plurality of voltage converters (104). If the voltage converters (104) are in a boost mode and a plurality of duty cycles of the voltage converters (104) calculated by the microcontroller (102) are less than 0.5, the microcontroller (102) is configured to limit at least one of the duty cycles of the voltage converters (104) to 0.5. If the voltage converters (104) are in a buck mode and the duty cycles of the voltage converters (104) calculated by the microcontroller (102) are greater than 0.5, the microcontroller (102) is configured to limit at least one of the duty cycles of the voltage converters (104) to 0.5.

10 Claims, 8 Drawing Sheets

(56) References Cited

U.S. PATENT DOCUMENTS

| | | | |
|---|---|---|---|
| 2006/0087295 A1* | 4/2006 | Jang | H02M 3/1584 |
| | | | 323/222 |
| 2010/0124082 A1* | 5/2010 | Lee | H02M 3/1584 |
| | | | 363/46 |
| 2015/0214848 A1 | 7/2015 | Umetani | |
| 2017/0012532 A1* | 1/2017 | Tago | H02M 3/1584 |
| 2018/0115280 A1* | 4/2018 | Ikeda | H02M 3/1584 |
| 2019/0386566 A1* | 12/2019 | Zhang | H02M 3/158 |
| 2022/0209664 A1* | 6/2022 | Zhang | H02M 1/0095 |
| 2022/0416665 A1* | 12/2022 | Tanaka | H02M 1/44 |

* cited by examiner

MULTI-PHASE CONVERTER INCLUDING A DUTY CYCLE LIMITER

BACKGROUND OF THE DISCLOSURE

Technical Field

The present disclosure relates to a power supply apparatus, and especially relates to a novel power supply apparatus.

Description of Related Art

The related art multi-phase interleaved bidirectional converter (for example, the related art four-phase interleaved bidirectional power converter) has the duty cycle limitation, which is described in detail as follows:

In the boost mode, the duty cycles of the low-side transistor switches need to be greater than 0.5; in the boost mode, if the duty cycles of the low-side transistor switches are less than 0.5, the inductor energy will not be enough, so that the inductor currents are unbalanced, which will cause the voltage gain to deteriorate (namely, decrease).

In the buck mode, the duty cycles of the high-side transistor switches need to be less than 0.5; in the buck mode, if the duty cycles of the high-side transistor switches are greater than 0.5, the inductor energy will not be enough, so that the inductor currents are unbalanced, which will cause the voltage gain to deteriorate (namely, increase).

SUMMARY OF THE DISCLOSURE

In order to solve the above-mentioned problems, an object of the present disclosure is to provide a novel power supply apparatus.

In order to achieve the object of the present disclosure mentioned above, the novel power supply apparatus of the present disclosure includes a microcontroller and a plurality of voltage converters. The voltage converters are electrically connected to each other and are electrically connected to the microcontroller. Moreover, if the voltage converters are in a boost mode and a plurality of duty cycles of the voltage converters calculated by the microcontroller are less than 0.5, the microcontroller is configured to limit at least one of the duty cycles of the voltage converters to 0.5. Moreover, if the voltage converters are in a buck mode and the duty cycles of the voltage converters calculated by the microcontroller are greater than 0.5, the microcontroller is configured to limit at least one of the duty cycles of the voltage converters to 0.5.

Moreover, in an embodiment of the novel power supply apparatus of the present disclosure mentioned above, the microcontroller includes a duty limiter electrically connected to at least one of the voltage converters.

Moreover, in an embodiment of the novel power supply apparatus of the present disclosure mentioned above, the microcontroller and the voltage converters are configured to form a multi-phase interleaved bidirectional converter. The voltage converters include a first voltage converter and a second voltage converter. The first voltage converter is electrically connected to the microcontroller. The second voltage converter is electrically connected to the duty limiter and the first voltage converter.

Moreover, in an embodiment of the novel power supply apparatus of the present disclosure mentioned above, the microcontroller and the voltage converters are configured to form a four-phase interleaved bidirectional converter. The voltage converters further include a third voltage converter and a fourth voltage converter. The third voltage converter is electrically connected to the duty limiter, the first voltage converter and the second voltage converter. The fourth voltage converter is electrically connected to the microcontroller, the first voltage converter, the second voltage converter and the third voltage converter.

Moreover, in an embodiment of the novel power supply apparatus of the present disclosure mentioned above, the first voltage converter includes a low-side first switch component, a high-side first switch component and a first inductor. The low-side first switch component is electrically connected to the microcontroller, and includes a low-side first parasitic diode. The high-side first switch component is electrically connected to the microcontroller and the low-side first switch component, and includes a high-side first parasitic diode. The first inductor is electrically connected to the second voltage converter, the third voltage converter, the fourth voltage converter, the low-side first switch component and the high-side first switch component.

Moreover, in an embodiment of the novel power supply apparatus of the present disclosure mentioned above, the second voltage converter includes a low-side second switch component, a high-side second switch component, a second inductor and a first capacitor. The low-side second switch component is electrically connected to the duty limiter, and includes a low-side second parasitic diode. The high-side second switch component is electrically connected to the duty limiter, the first voltage converter and the third voltage converter, and includes a high-side second parasitic diode. The second inductor is electrically connected to the first voltage converter, the third voltage converter, the fourth voltage converter and the low-side second switch component. The first capacitor is electrically connected to the first voltage converter, the low-side second switch component, the high-side second switch component and the second inductor.

Moreover, in an embodiment of the novel power supply apparatus of the present disclosure mentioned above, the third voltage converter includes a low-side third switch component, a high-side third switch component, a third inductor and a second capacitor. The low-side third switch component is electrically connected to the duty limiter, and includes a low-side third parasitic diode. The high-side third switch component is electrically connected to the duty limiter, the second voltage converter and the fourth voltage converter, and includes a high-side third parasitic diode. The third inductor is electrically connected to the first voltage converter, the second voltage converter, the fourth voltage converter and the low-side third switch component. The second capacitor is electrically connected to the second voltage converter, the low-side third switch component, the high-side third switch component and the third inductor.

Moreover, in an embodiment of the novel power supply apparatus of the present disclosure mentioned above, the fourth voltage converter includes a low-side fourth switch component, a high-side fourth switch component, a fourth inductor and a third capacitor. The low-side fourth switch component is electrically connected to the microcontroller, and includes a low-side fourth parasitic diode. The high-side fourth switch component is electrically connected to the microcontroller, the first voltage converter and the third voltage converter, and includes a high-side fourth parasitic diode. The fourth inductor is electrically connected to the first voltage converter, the second voltage converter, the third voltage converter and the low-side fourth switch component. The third capacitor is electrically connected to the third voltage converter, the low-side fourth switch component, the high-side fourth switch component and the fourth inductor.

Moreover, in an embodiment of the novel power supply apparatus of the present disclosure mentioned above, the first voltage converter further includes a low-side capacitor and a low-side input-output point. The low-side capacitor is electrically connected to the microcontroller, the second voltage converter, the third voltage converter and the fourth voltage converter. The low-side input-output point is electrically connected to the microcontroller, the second voltage converter, the third voltage converter, the fourth voltage converter and the low-side capacitor.

Moreover, in an embodiment of the novel power supply apparatus of the present disclosure mentioned above, the first voltage converter further includes a high-side capacitor and a high-side input-output point. The high-side capacitor is electrically connected to the microcontroller and the fourth voltage converter. The high-side input-output point is electrically connected to the microcontroller, the fourth voltage converter and the high-side capacitor.

The advantage of the present disclosure is that: the voltage gain is not affected by the duty cycle less than 0.5 in the boost mode; the voltage gain is not affected by the duty cycle greater than 0.5 in the buck mode. The operating mechanism for the switch components provided by the present disclosure can make the inductor energy sufficient and the inductor currents balanced, so that the above-mentioned voltage gain can be achieved without being affected by the duty cycle.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
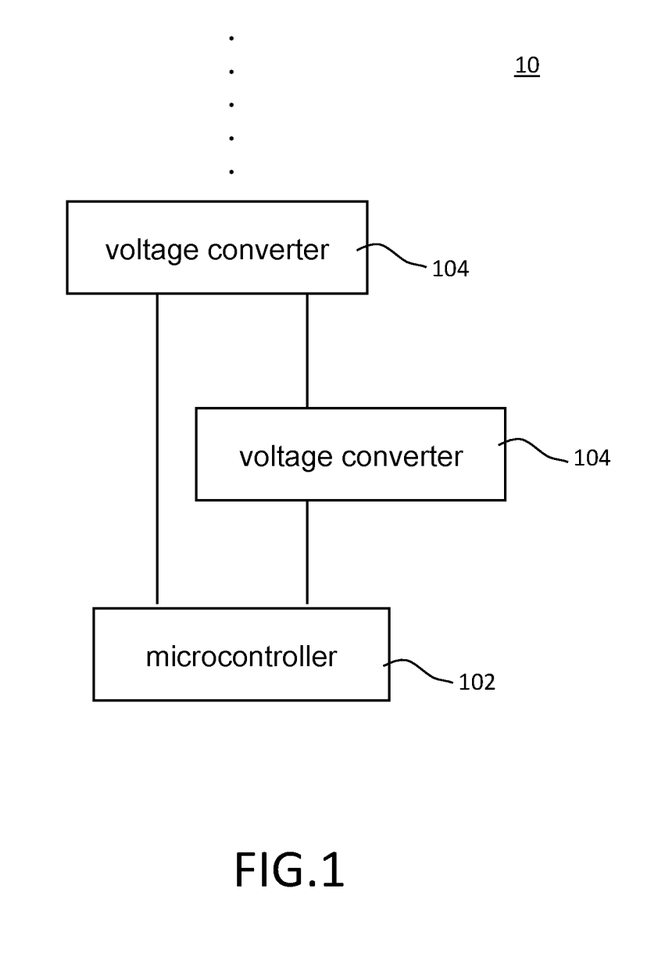
FIG. 1 shows a block diagram of an embodiment of the novel power supply apparatus of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of an embodiment of the novel power supply apparatus 10 of the present disclosure. A novel power supply apparatus 10 of the present disclosure includes a microcontroller 102 and a plurality of voltage converters 104. The voltage converters 104 are electrically connected to each other and are electrically connected to the microcontroller 102. If the voltage converters 104 are in a boost mode and a plurality of duty cycles of the voltage converters 104 calculated by the microcontroller 102 are less than 0.5, the microcontroller 102 is configured to limit at least one of the duty cycles of the voltage converters 104 to 0.5 (detailed later). If the voltage converters 104 are in a buck mode and the duty cycles of the voltage converters 104 calculated by the microcontroller 102 are greater than 0.5, the microcontroller 102 is configured to limit at least one of the duty cycles of the voltage converters 104 to 0.5 (detailed later).

In more detail, if the voltage converters 104 are in the boost mode and the duty cycles of a plurality of low-side switch components of the voltage converters 104 calculated by the microcontroller 102 are less than 0.5, the microcontroller 102 is configured to limit at least one of the duty cycles of the low-side switch components of the voltage converters 104 to 0.5. If the voltage converters 104 are in the buck mode and the duty cycles of a plurality of high-side switch components of the voltage converters 104 calculated by the microcontroller 102 are greater than 0.5, the microcontroller 102 is configured to limit at least one of the duty cycles of the high-side switch components of the voltage converters 104 to 0.5. Moreover, the low-side switch components may be, for example, a low-side first switch component QL1, a low-side second switch component QL2, a low-side third switch component QL3 and a low-side fourth switch component QL4 shown in FIG. 2; the high-side switch components may be, for example, a high-side first switch component QH1, a high-side second switch component QH2, a high-side third switch component QH3 and a high-side fourth switch component QH4 shown in FIG. 2.

Figure 2:
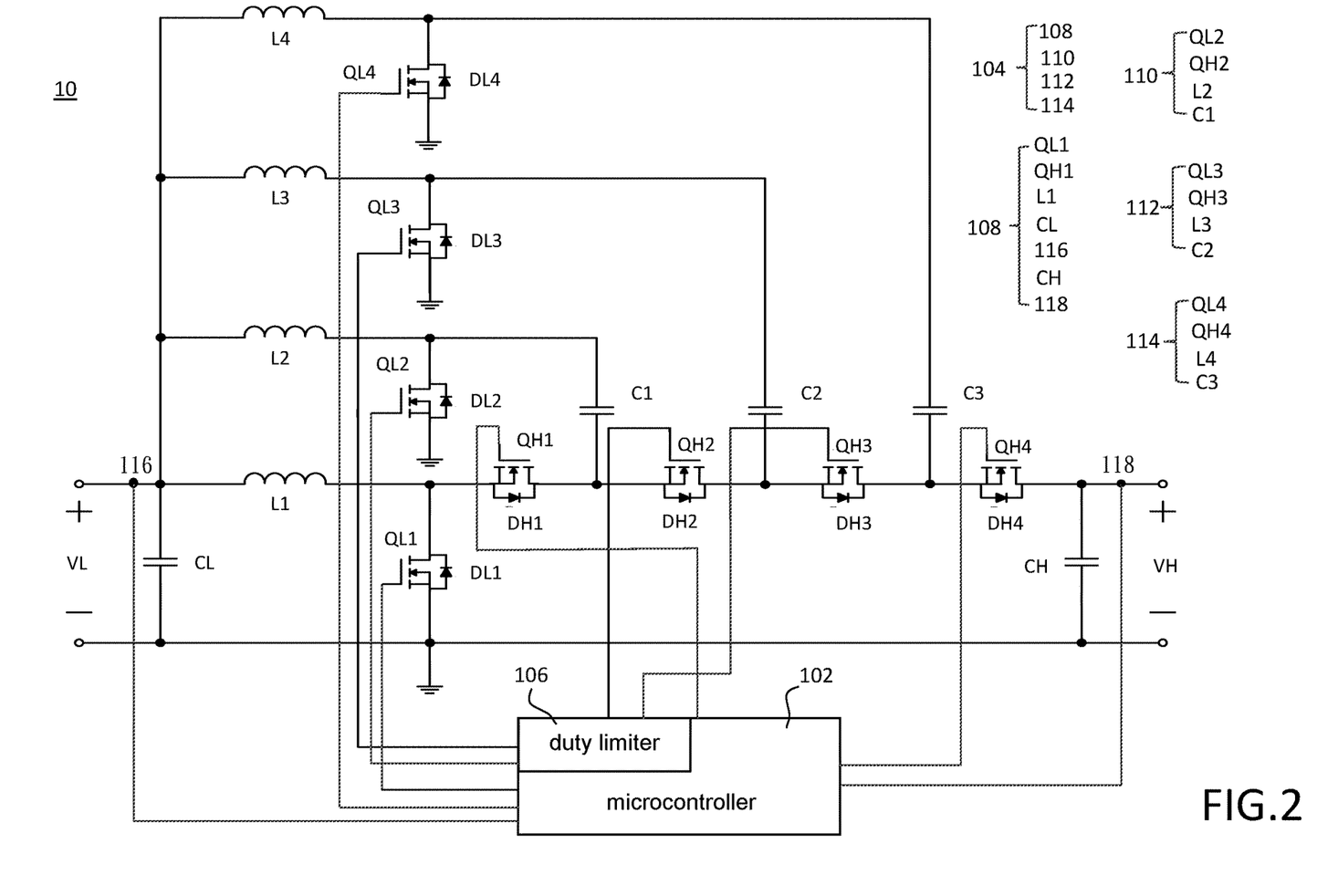
FIG. 2 shows a circuit block diagram of an embodiment of the novel power supply apparatus of the present disclosure.

FIG. 2 shows a circuit block diagram of an embodiment of the novel power supply apparatus 10 of the present disclosure. The descriptions of the elements shown in FIG. 2 which are the same as the elements shown in FIG. 1 are not repeated here for brevity. The microcontroller 102 includes a duty limiter 106. The voltage converters 104 include a first voltage converter 108, a second voltage converter 110, a third voltage converter 112 and a fourth voltage converter 114. The first voltage converter 108 includes a low-side first switch component QL1, a high-side first switch component QH1, a first inductor L1, a low-side capacitor CL, a low-side input-output point 116, a high-side capacitor CH and a high-side input-output point 118. The second voltage converter 110 includes a low-side second switch component QL2, a high-side second switch component QH2, a second inductor L2 and a first capacitor C1. The third voltage converter 112 includes a low-side third switch component QL3, a high-side third switch component QH3, a third inductor L3 and a second capacitor C2. The fourth voltage converter 114 includes a low-side fourth switch component QL4, a high-side fourth switch component QH4, a fourth inductor L4 and a third capacitor C3. The above-mentioned components are electrically connected to each other.

The low-side first switch component QL1 includes a low-side first parasitic diode DL1. The high-side first switch component QH1 includes a high-side first parasitic diode DH1. The low-side second switch component QL2 includes a low-side second parasitic diode DL2. The high-side second switch component QH2 includes a high-side second parasitic diode DH2. The low-side third switch component QL3 includes a low-side third parasitic diode DL3. The high-side third switch component QH3 includes a high-side third parasitic diode DH3. The low-side fourth switch component QL4 includes a low-side fourth parasitic diode DL4. The high-side fourth switch component QH4 includes a high-side fourth parasitic diode DH4. The low-side input-output point 116 includes a low-side voltage VL. The high-side input-output point 118 includes a high-side voltage VH. The low-side first switch component QL1, the high-side first switch component QH1, the low-side second switch component QL2, the high-side second switch component QH2, the low-side third switch component QL3, the high-side third switch component QH3, the low-side fourth switch component QL4 and the high-side fourth switch component QH4 may be implemented with any switch components, such as metal oxide semiconductor field effect transistors (MOSFETs), insulated gate bipolar translators (IGBTs) or high electron mobility transistors (HEMTs). FIG. 2 shows these switch components are N-MOSFETs.

Moreover, if the voltage converters 104 are in the boost mode and the duty cycles of the low-side switch components of the voltage converters 104 calculated by the microcontroller 102 are less than 0.5, the microcontroller 102 is configured to utilize the duty limiter 106 to limit at least one of the duty cycles of the low-side switch components of the voltage converters 104 to 0.5 (detailed later). If the voltage converters 104 are in the buck mode and the duty cycles of the high-side switch components of the voltage converters 104 calculated by the microcontroller 102 are greater than 0.5, the microcontroller 102 is configured to utilize the duty limiter 106 to limit at least one of the duty cycles of the high-side switch components of the voltage converters 104 to 0.5 (detailed later). The duty limiter 106 may be implemented with hardware or software. If the duty limiter 106 is implemented with software, the present disclosure does not need to increase the cost for hardware.

The microcontroller 102 and the voltage converters 104 are configured to form a multi-phase (two-phase, three-phase, four-phase and so on) interleaved bidirectional converter, such as a four-phase interleaved bidirectional converter shown in FIG. 2. If the voltage converters 104 are in the boost mode, the low-side voltage VL is an input voltage (supplied by a voltage supply not shown in FIG. 2) and the high-side voltage VH is an output voltage (supplied to a load not shown in FIG. 2).

Moreover, taking the four-phase interleaved bidirectional converter shown in FIG. 2 and the boost mode as an example, the microcontroller 102 is configured to calculate: a voltage gain=an output voltage/an input voltage=4/(1−the duty cycle). Assume that the microcontroller 102 senses that the input voltage (VL) is 40 volts through the low-side input-output point 116, and senses that the output voltage (VH; namely, required by the load) is 213 volts through the high-side input-output point 118; then, 213/40=5.325=4/(1−the duty cycle), so that the duty cycle is calculated about 0.25; here, the duty cycle 0.25 refers to the theoretical duty cycles of the low-side switch components (namely, the low-side first switch component QL1, the low-side second switch component QL2, the low-side third switch component QL3 and the low-side fourth switch component QL4); the switching operation of each of the high-side switch components (namely, the high-side first switch component QH1, the high-side second switch component QH2, the high-side third switch component QH3 and the high-side fourth switch component QH4) is opposite to the corresponding low-side switch component; namely, when the low-side first switch component QL1 is ON, the high-side first switch component QH1 is OFF; when the low-side first switch component QL1 is OFF, the high-side first switch component QH1 is ON, and so on.

Continuing from the above contents, calculating the theoretical duty cycles of the low-side switch components in the boost mode less than 0.5 is problematic (because the inductor energy will not be enough, so that the inductor currents are unbalanced); in the boost mode, the formula for the voltage gain that the duty cycle of the low-side switch component is less than 0.5 will no longer apply=4/(1−the duty cycle). Through circuit simulation software experiments, if the input voltage is 40 volts and the duty cycles of the low-side switch components are 0.25, the output voltage is only 79 volts instead of the required 213 volts. However, the present disclosure skillfully limits at least one of the duty cycles of the low-side switch components of the voltage converters 104 to 0.5, and maintains the duty cycles of the remaining low-side switch components at 0.25 (namely, maintaining that the duty cycles of the remaining low-side switch components are calculated by the microcontroller 102 as the voltage gain=the output voltage/the input voltage=4/(1−the duty cycle)); through circuit simulation software experiments, the output voltage is the required 213 volts.

Figure 3:
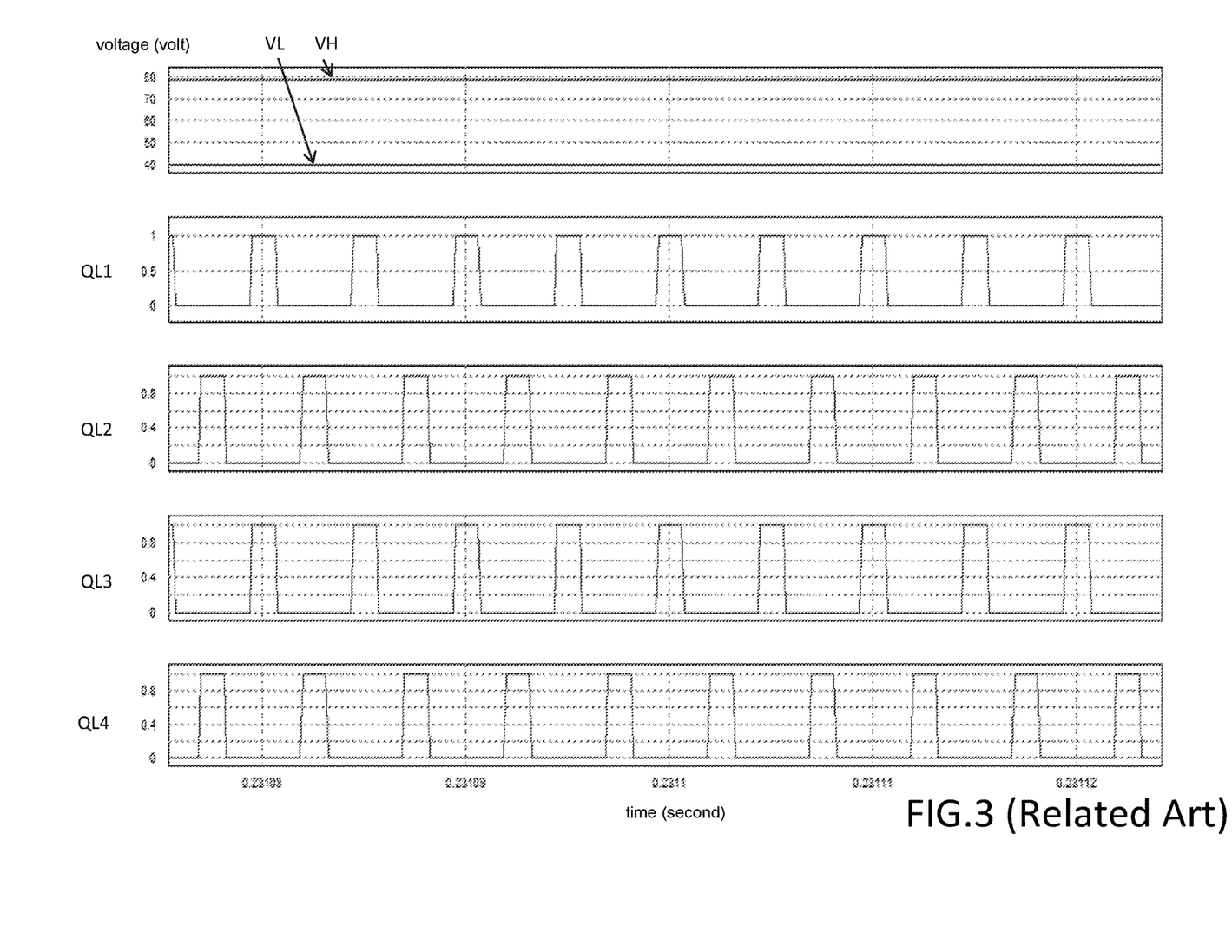
FIG. 3 shows a waveform diagram of the voltages and the duty cycles of the low-side switch components of an example of the related art four-phase interleaved bidirectional power converter in the boost mode.

FIG. 3 shows a waveform diagram of the voltages and the duty cycles of the low-side switch components of an example of the related art four-phase interleaved bidirectional power converter in the boost mode. As mentioned above, if the input voltage (VL) is 40 volts and the duty cycle of each of the low-side switch components is 0.25, the output voltage (VH) is only 79 volts instead of the required 213 volts.

Figure 4:
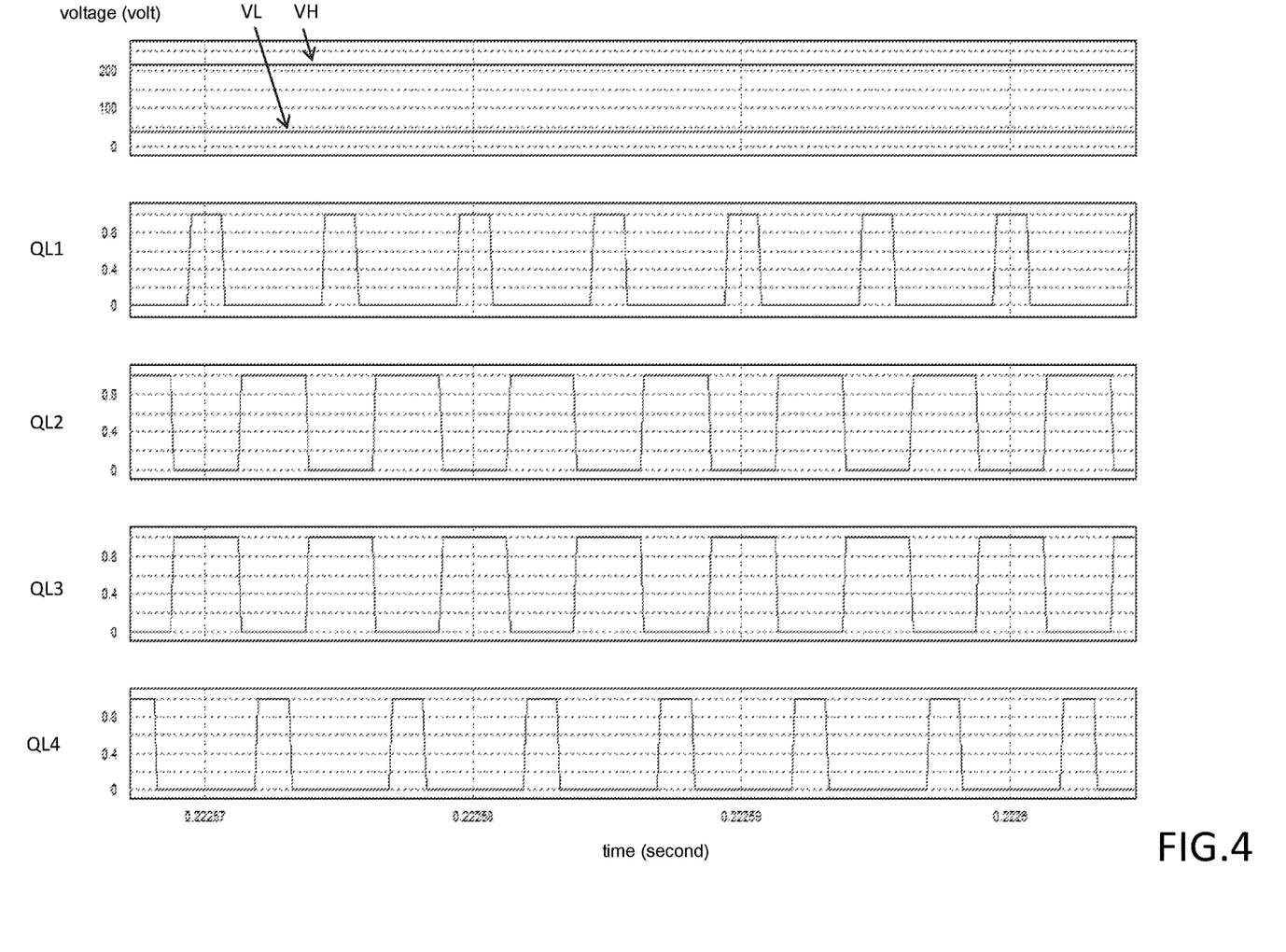
FIG. 4 shows a waveform diagram of the voltages and the duty cycles of the low-side switch components of an embodiment of the novel power supply apparatus of the present disclosure in the boost mode.

FIG. 4 shows a waveform diagram of the voltages and the duty cycles of the low-side switch components of an embodiment of the novel power supply apparatus 10 of the present disclosure in the boost mode. As mentioned above, if the input voltage (VL) is 40 volts and at least one (for example, more than half, or two) of the duty cycles of the low-side switch components are limited to 0.5 (namely, the duty cycles of the low-side second switch component QL2 and the low-side third switch component QL3 are limited to 0.5) and the duty cycles of the remaining low-side switch components are maintained at 0.25 (namely, the duty cycles of the low-side first switch component QL1 and the low-side fourth switch component QL4 are maintained at 0.25), the output voltage (VH) is the required 213 volts.

Figure 5:
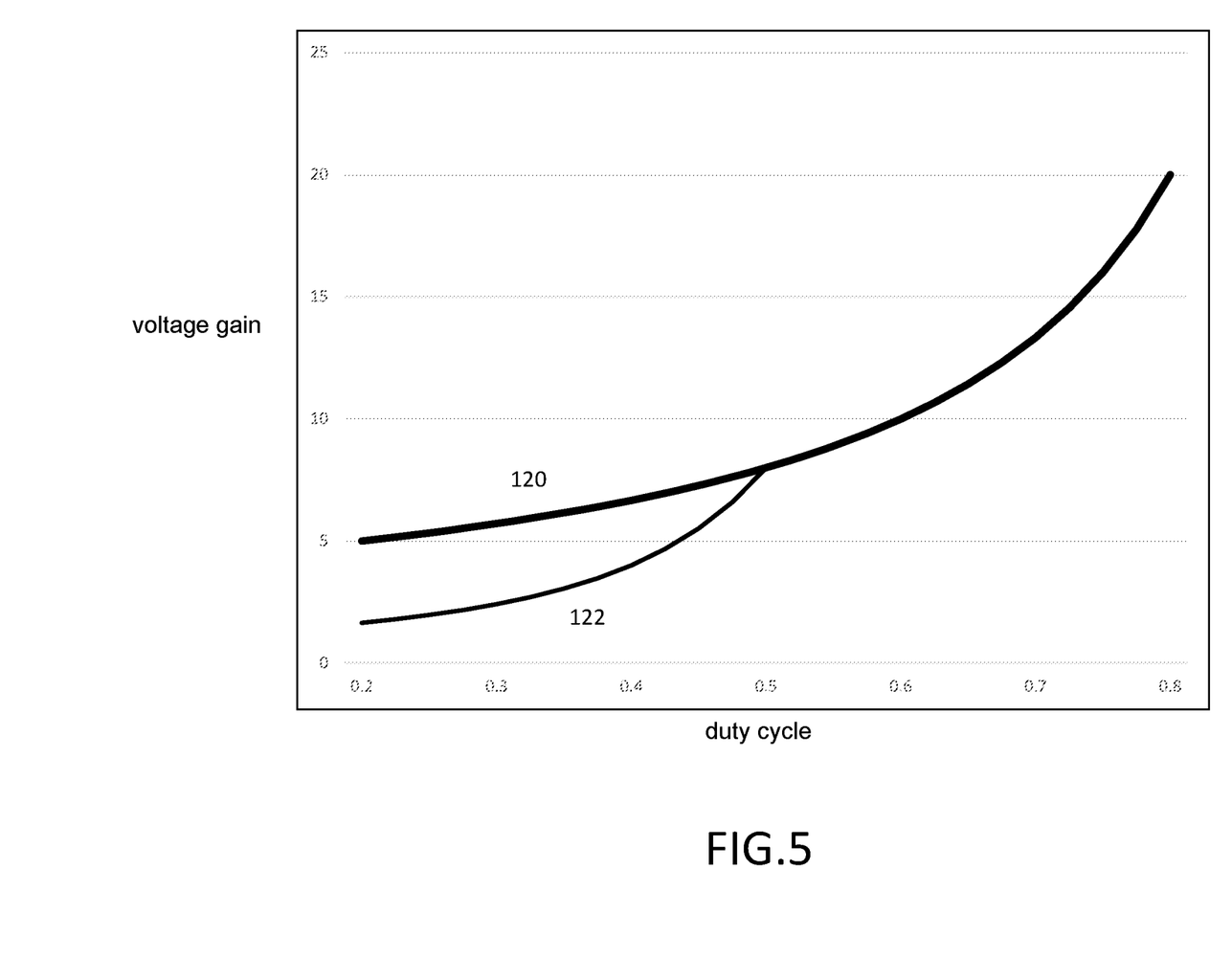
FIG. 5 shows a comparison diagram of the duty cycles of the low-side switch components and the voltage gains of the novel power supply apparatus of the present disclosure and the related art four-phase interleaved bidirectional power converter in the boost mode.

FIG. 5 shows a comparison diagram of the duty cycles of the low-side switch components and the voltage gains of the novel power supply apparatus 10 of the present disclosure and the related art four-phase interleaved bidirectional power converter in the boost mode. A first curve 120 is the curve of the present disclosure while a second curve 122 is the curve of the related art; it can be seen that in the boost mode if the duty cycles of the low-side switch components are greater than 0.5, the voltage gains of the present disclosure and the related art are normal, but once the duty cycles of the low-side switch components are less than 0.5, the voltage gains of the related art (the second curve 122) will be greatly reduced, while the present disclosure (the first curve 120) can still maintain higher voltage gains.

Figure 6:
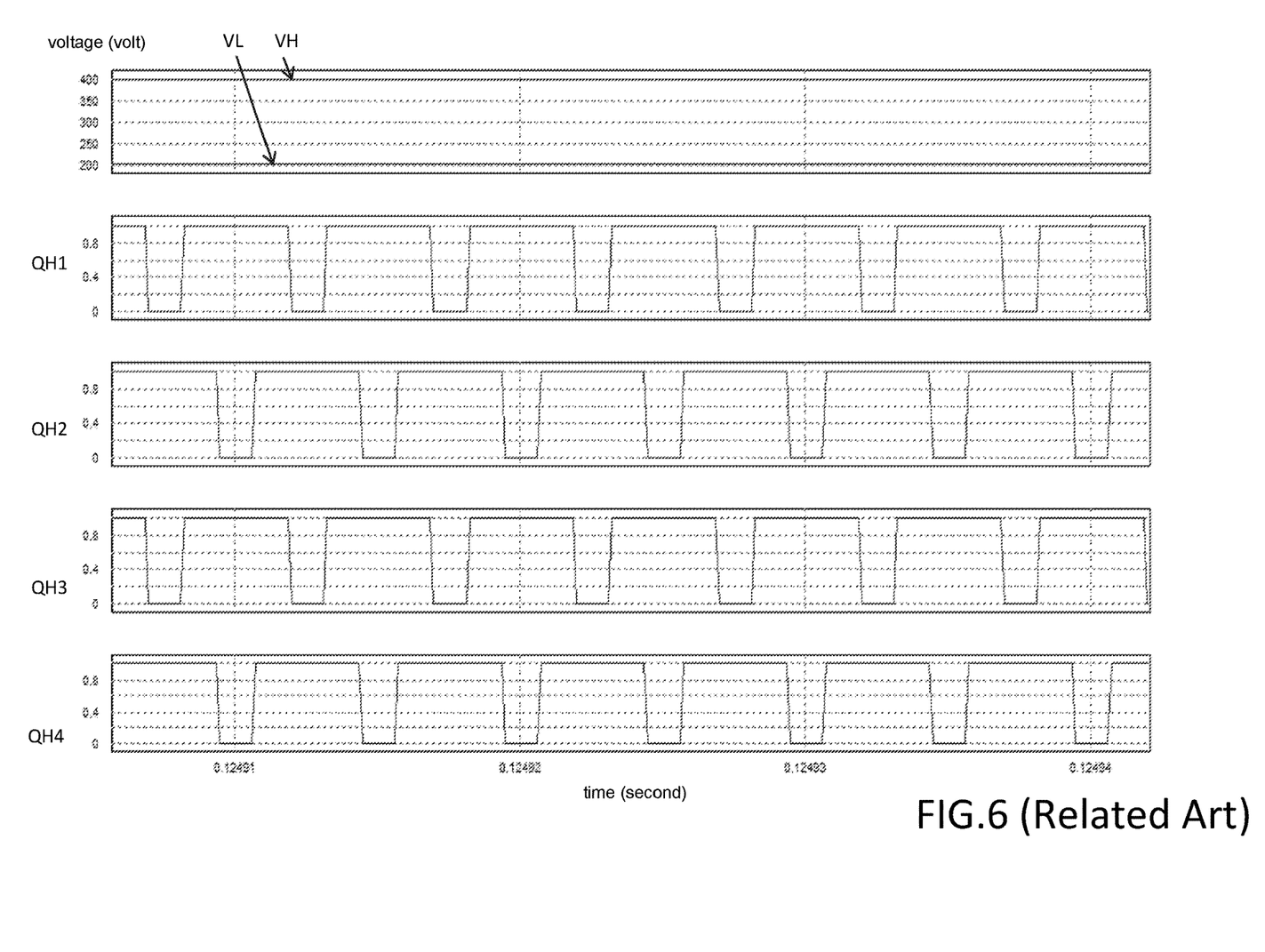
FIG. 6 shows a waveform diagram of the voltages and the duty cycles of the high-side switch components of an example of the related art four-phase interleaved bidirectional power converter in the buck mode.
Figure 7:
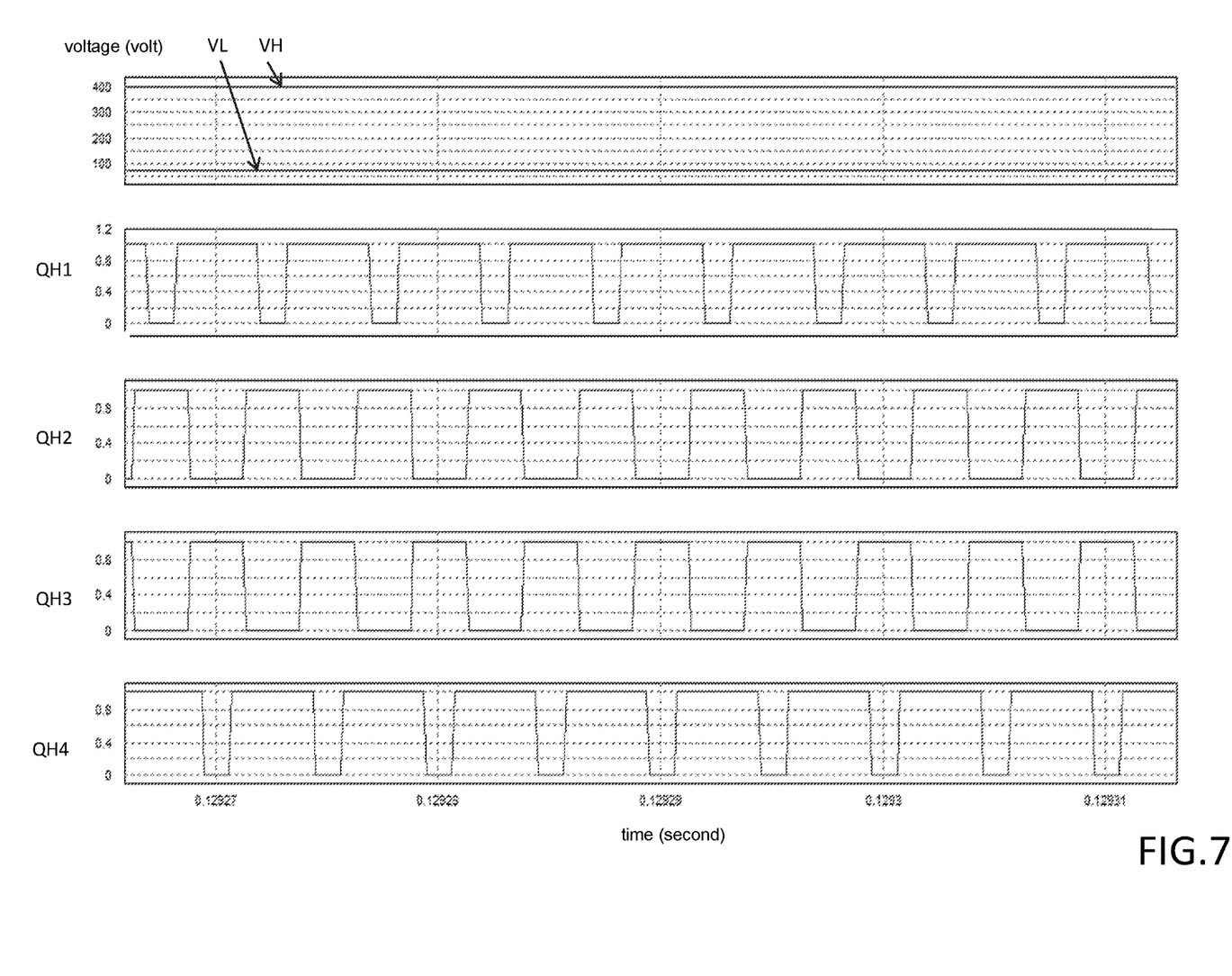
FIG. 7 shows a waveform diagram of the voltages and the duty cycles of the high-side switch components of an embodiment of the novel power supply apparatus of the present disclosure in the buck mode.
Figure 8:
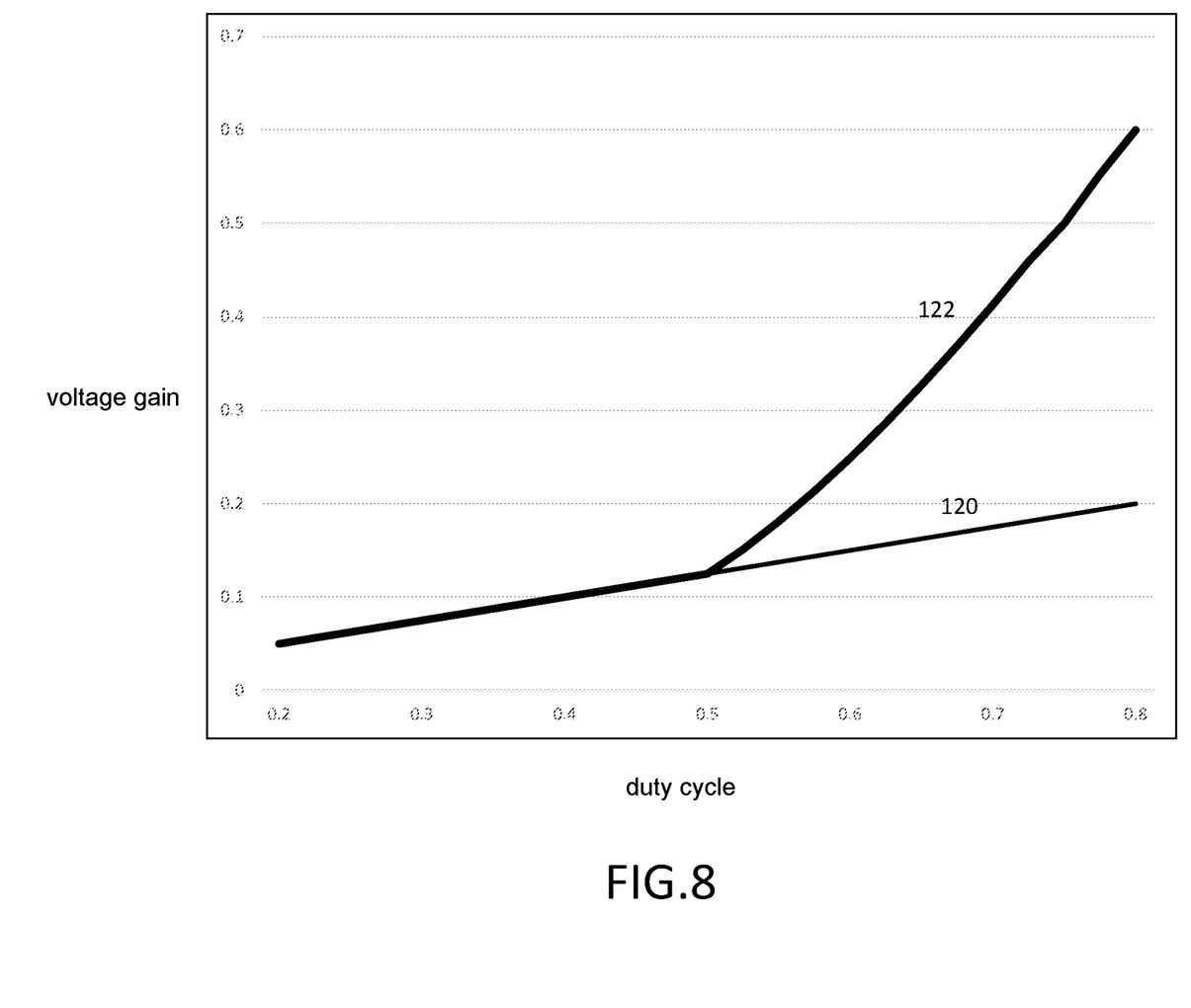
FIG. 8 shows a comparison diagram of the duty cycles of the high-side switch components and the voltage gains of the novel power supply apparatus of the present disclosure and the related art four-phase interleaved bidirectional power converter in the buck mode.

The above-mentioned FIG. 3, FIG. 4 and FIG. 5 are for the boost mode, and the following FIG. 6, FIG. 7 and FIG. 8 are for the buck mode.

Moreover, taking the four-phase interleaved bidirectional converter shown in FIG. 2 and the buck mode as an example, the microcontroller 102 is configured to calculate: the voltage gain=the output voltage/the input voltage=the duty cycle/4. Assume that the microcontroller 102 senses that the input voltage (VH) is 400 volts through the high-side input-output point 118, and senses that the output voltage (VL; namely, required by the load) is 75 volts through the low-side input-output point 116; then, 75/400=0.1875=the duty cycle/4, so that the duty cycle is calculated as 0.75; here, the duty cycle 0.75 refers to the theoretical duty cycles of the high-side switch components (namely, the high-side first switch component QH1, the high-side second switch component QH2, the high-side third switch component QH3 and the high-side fourth switch component QH4); the switching operation of each of the low-side switch components (namely, the low-side first switch component QL1, the low-side second switch component QL2, the low-side third switch component QL3 and the low-side fourth switch component QL4) is opposite to the corresponding high-side switch component; namely, when the high-side first switch component QH1 is ON, the low-side first switch component QL1 is OFF; when the high-side first switch component QH1 is OFF, the low-side first switch component QL1 is ON, and so on.

Continuing from the above contents, calculating the theoretical duty cycles of the high-side switch components in the buck mode greater than 0.5 is problematic (because the inductor energy will not be enough, so that the inductor currents are unbalanced); in the buck mode, the formula for the voltage gain that the duty cycle of the high-side switch component is greater than 0.5 will no longer apply=the duty cycle/4. Through circuit simulation software experiments, if the input voltage is 400 volts and the duty cycles of the high-side switch components are 0.75, the output voltage is only 200 volts instead of the required 75 volts. However, the present disclosure skillfully limits at least one of the duty cycles of the high-side switch components of the voltage converters 104 to 0.5, and maintains the duty cycles of the remaining high-side switch components at 0.75 (namely, maintaining that the duty cycles of the remaining high-side switch components are calculated by the microcontroller 102 as the voltage gain=the output voltage/the input voltage=the duty cycle/4); through circuit simulation software experiments, the output voltage is the required 75 volts.

FIG. 6 shows a waveform diagram of the voltages and the duty cycles of the high-side switch components of an example of the related art four-phase interleaved bidirectional power converter in the buck mode. As mentioned above, if the input voltage (VH) is 400 volts and the duty cycle of each of the high-side switch components is 0.75, the output voltage (VL) is only 200 volts instead of the required 75 volts.

FIG. 7 shows a waveform diagram of the voltages and the duty cycles of the high-side switch components of an embodiment of the novel power supply apparatus 10 of the present disclosure in the buck mode. As mentioned above, if the input voltage (VH) is 400 volts and at least one (for example, more than half, or two) of the duty cycles of the high-side switch components are limited to 0.5 (namely, the duty cycles of the high-side second switch component QH2 and the high-side third switch component QH3 are limited to 0.5) and the duty cycles of the remaining high-side switch components are maintained at 0.75 (namely, the duty cycles of the high-side first switch component QH1 and the high-side fourth switch component QH4 are maintained at 0.75), the output voltage (VL) is the required 75 volts.

FIG. 8 shows a comparison diagram of the duty cycles of the high-side switch components and the voltage gains of the novel power supply apparatus 10 of the present disclosure and the related art four-phase interleaved bidirectional power converter in the buck mode. A first curve 120 is the curve of the present disclosure while a second curve 122 is the curve of the related art; it can be seen that in the buck mode if the duty cycles of the high-side switch components are less than 0.5, the voltage gains of the present disclosure and the related art are normal, but once the duty cycles of the high-side switch components are greater than 0.5, the voltage gains of the related art (the second curve 122) will be greatly increased, while the present disclosure (the first curve 120) can still maintain lower voltage gains.

The advantage of the present disclosure is that: the voltage gain is not affected by the duty cycle less than 0.5 in the boost mode; the voltage gain is not affected by the duty cycle greater than 0.5 in the buck mode. The operating mechanism for the switch components provided by the present disclosure can make the inductor energy sufficient and the inductor currents balanced, so that the above-mentioned voltage gain can be achieved without being affected by the duty cycle.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A power supply apparatus (10) comprising:
   a microcontroller (102); and
   a plurality of voltage converters (104) electrically connected to each other and electrically connected to the microcontroller (102),
   wherein if the voltage converters (104) are in a boost mode and a plurality of duty cycles of the voltage converters (104) calculated by the microcontroller (102) are less than 0.5, the microcontroller (102) is configured to limit at least one of the duty cycles of the voltage converters (104) to 0.5;
   wherein if the voltage converters (104) are in a buck mode and the duty cycles of the voltage converters (104) calculated by the microcontroller (102) are greater than 0.5, the microcontroller (102) is configured to limit at least one of the duty cycles of the voltage converters (104) to 0.5.

2. The power supply apparatus (10) of claim 1, wherein the microcontroller (102) comprises:
a duty limiter (106) electrically connected to at least one of the voltage converters (104).

3. The power supply apparatus (10) of claim 2, wherein the microcontroller (102) and the voltage converters (104) are configured to form a multi-phase interleaved bidirectional converter; the voltage converters (104) comprise:
a first voltage converter (108) electrically connected to the microcontroller (102); and
a second voltage converter (110) electrically connected to the duty limiter (106) and the first voltage converter (108).

4. The power supply apparatus (10) of claim 3, wherein the microcontroller (102) and the voltage converters (104) are configured to form a four-phase interleaved bidirectional converter; the voltage converters (104) further comprise:
a third voltage converter (112) electrically connected to the duty limiter (106), the first voltage converter (108) and the second voltage converter (110); and
a fourth voltage converter (114) electrically connected to the microcontroller (102), the first voltage converter (108), the second voltage converter (110) and the third voltage converter (112).

5. The power supply apparatus (10) of claim 4, wherein the first voltage converter (108) comprises:
a low-side first switch component (QL1) electrically connected to the microcontroller (102), and comprising a low-side first parasitic diode (DL1);
a high-side first switch component (QH1) electrically connected to the microcontroller (102) and the low-side first switch component (QL1), and comprising a high-side first parasitic diode (DH1); and
a first inductor (L1) electrically connected to the second voltage converter (110), the third voltage converter (112), the fourth voltage converter (114), the low-side first switch component (QL1) and the high-side first switch component (QH1).

6. The power supply apparatus (10) of claim 5, wherein the second voltage converter (110) comprises:
a low-side second switch component (QL2) electrically connected to the duty limiter (106), and comprising a low-side second parasitic diode (DL2);
a high-side second switch component (QH2) electrically connected to the duty limiter (106), the first voltage converter (108) and the third voltage converter (112), and comprising a high-side second parasitic diode (DH2);
a second inductor (L2) electrically connected to the first voltage converter (108), the third voltage converter (112), the fourth voltage converter (114) and the low-side second switch component (QL2); and
a first capacitor (C1) electrically connected to the first voltage converter (108), the low-side second switch component (QL2), the high-side second switch component (QH2) and the second inductor (L2).

7. The power supply apparatus (10) of claim 6, wherein the third voltage converter (112) comprises:
a low-side third switch component (QL3) electrically connected to the duty limiter (106), and comprising a low-side third parasitic diode (DL3);
a high-side third switch component (QH3) electrically connected to the duty limiter (106), the second voltage converter (110) and the fourth voltage converter (114), and comprising a high-side third parasitic diode (DH3);
a third inductor (L3) electrically connected to the first voltage converter (108), the second voltage converter (110), the fourth voltage converter (114) and the low-side third switch component (QL3); and
a second capacitor (C2) electrically connected to the second voltage converter (110), the low-side third switch component (QL3), the high-side third switch component (QH3) and the third inductor (L3).

8. The power supply apparatus (10) of claim 7, wherein the fourth voltage converter (114) comprises:
a low-side fourth switch component (QL4) electrically connected to the microcontroller (102), and comprising a low-side fourth parasitic diode (DL4);
a high-side fourth switch component (QH4) electrically connected to the microcontroller (102), the first voltage converter (108) and the third voltage converter (112), and comprising a high-side fourth parasitic diode (DH4);
a fourth inductor (L4) electrically connected to the first voltage converter (108), the second voltage converter (110), the third voltage converter (112) and the low-side fourth switch component (QL4); and
a third capacitor (C3) electrically connected to the third voltage converter (112), the low-side fourth switch component (QL4), the high-side fourth switch component (QH4) and the fourth inductor (L4).

9. The power supply apparatus (10) of claim 8, wherein the first voltage converter (108) further comprises:
a low-side capacitor (CL) electrically connected to the microcontroller (102), the second voltage converter (110), the third voltage converter (112) and the fourth voltage converter (114); and
a low-side input-output point (116) electrically connected to the microcontroller (102), the second voltage converter (110), the third voltage converter (112), the fourth voltage converter (114) and the low-side capacitor (CL).

10. The power supply apparatus (10) of claim 9, wherein the first voltage converter (108) further comprises:
a high-side capacitor (CH) electrically connected to the microcontroller (102) and the fourth voltage converter (114); and
a high-side input-output point (118) electrically connected to the microcontroller (102), the fourth voltage converter (114) and the high-side capacitor (CH).

* * * * *